(12) United States Patent
Tsuga et al.

(10) Patent No.: US 9,911,987 B2
(45) Date of Patent: Mar. 6, 2018

(54) FUEL CELL STACK

(71) Applicant: NGK SPARK PLUG CO., LTD., Nagoya-shi, Aichi (JP)

(72) Inventors: Shunsuke Tsuga, Aichi (JP); Takafumi Shichida, Aichi (JP); Tetsuya Morikawa, Ichinomiya (JP); Nobuyuki Hotta, Konan (JP)

(73) Assignee: NGK SPARK PLUG CO., LTD., Aichi (JP)

(*) Notice: Subject to any disclaimer, the term of this patent is extended or adjusted under 35 U.S.C. 154(b) by 746 days.

(21) Appl. No.: 14/224,339

(22) Filed: Mar. 25, 2014

(65) Prior Publication Data

US 2014/0295308 A1    Oct. 2, 2014

(30) Foreign Application Priority Data

Mar. 29, 2013 (JP) ................. 2013-072923

(51) Int. Cl.

| | | |
|---|---|---|
| *H01M 8/04* | (2016.01) | |
| *H01M 8/04014* | (2016.01) | |
| *H01M 8/04007* | (2016.01) | |
| *H01M 8/247* | (2016.01) | |
| *H01M 8/2465* | (2016.01) | |
| *H01M 8/248* | (2016.01) | |
| *H01M 8/24* | (2016.01) | |
| *H01M 8/242* | (2016.01) | |

(52) U.S. Cl.
CPC ... *H01M 8/04014* (2013.01); *H01M 8/04067* (2013.01); *H01M 8/04074* (2013.01); *H01M 8/247* (2013.01); *H01M 8/248* (2013.01); *H01M 8/2465* (2013.01); *H01M 8/242* (2013.01); *H01M 8/2405* (2013.01)

(58) Field of Classification Search
CPC ............. H01M 8/04014; H01M 8/2465–8/248
USPC .................. 429/456–462, 439, 434, 435
See application file for complete search history.

(56) References Cited

U.S. PATENT DOCUMENTS

| | | | |
|---|---|---|---|
| 2004/0043279 A1* | 3/2004 | Rapaport ............ | H01M 8/0258 429/455 |
| 2004/0081872 A1* | 4/2004 | Herman ............ | H01M 8/04014 429/413 |
| 2010/0055525 A1* | 3/2010 | Uematsu ............... | H01M 8/248 429/480 |
| 2016/0056492 A1* | 2/2016 | Tsuga .................. | H01M 8/2485 429/458 |

FOREIGN PATENT DOCUMENTS

| | | |
|---|---|---|
| JP | 61-49382 A | 3/1986 |
| JP | 2005-5074 A | 1/2005 |
| WO | 2013/065757 A1 | 5/2013 |

* cited by examiner

*Primary Examiner* — Jonathan G Leong
(74) *Attorney, Agent, or Firm* — Sughrue Mion, PLLC

(57) ABSTRACT

A fuel cell stack (1) includes a plurality of stacked power generation cells (3), a heat exchange unit (7) provided between adjacent two of the power generation cells, a fuel gas supply path arranged to supply the power generation cells with a fuel gas, and an oxidant gas supply path (3, 7, 33, 34, 38) arranged to supply the power generation cells with an oxidant gas, wherein the fuel gas supply path includes in series a first path (7, 31) passing through the heat exchange unit (7), a second path (3, 32, 35, 37) passing through some of the plurality of power generation cells (3) in parallel, and a third path (3, 32, 36) passing through the other power generation cells in parallel.

7 Claims, 10 Drawing Sheets

FUEL CELL STACK

BACKGROUND OF THE INVENTION

1. Field of the Invention

The present invention relates to a fuel cell stack.

2. Description of the Related Art

Conventionally, a solid oxide fuel cell (hereinafter, also abbreviated as SOFC) using a solid electrolyte (solid oxide) is known as a fuel cell.

In the SOFC, for example, a fuel cell (power generation cell) provided with a fuel electrode in contact with a fuel gas on one side of a solid electrolyte membrane while provided with an oxidant electrode (air electrode) in contact with an oxidant gas (air) on the other side is used as a power unit. Further, a fuel cell stack having a plurality of power generation cells stacked via interconnectors has been developed in order to obtain a desired voltage.

In general, in this type of fuel cell stack, a problem arises in that the temperature of the power generation cells closer to the center in a stacking direction of the power generation cells becomes higher than that of the power generation cells closer to the ends in the stacking direction of the power generation cells.

In order to solve this problem, a technique has been proposed for supplying cold air to one lateral side close to the center in the stacking direction, while supplying a heat-exchanged hot gas to the ends in the stacking direction of the fuel cell stack (see Patent Literature 1).

[Patent Literature 1] JP-A-2005-5074

3. Problem Addressed by the Invention

Because the above-described conventional technique supplies cold air from one lateral side, the power generation cells closer to the center in the stacking direction of the fuel cell stack cannot be sufficiently cooled. In addition, the above conventional technique cannot sufficiently increase the fuel gas utilization efficiency.

SUMMARY OF THE INVENTION

The present invention has been made in view of the above-described problems, and an object thereof is to provide a fuel cell stack that effectively cools power generation cells that are disposed closer to the center in a stacking direction of the fuel cell stack, and that has a high utilization efficiency of a fuel gas.

The above object has been achieved by providing (1) a fuel cell stack which comprises:

a plurality of stacked power generation cells;

a heat exchange unit provided between adjacent two of the power generation cells;

a fuel gas supply path arranged to supply the power generation cells with a fuel gas; and an oxidant gas supply path arranged to supply the power generation cells with an oxidant gas, wherein the fuel gas supply path comprises in series a first path passing through the heat exchange unit, a second path passing through some of the plurality of power generation cells in parallel, and a third path passing through a plurality of the power generation cells, in parallel, other than the some of the power generation cells where the second path passes.

In a preferred embodiment (2) of the fuel cell stack (1), the heat exchange unit comprises a plurality of heat exchange units, and the first path comprises a parallel flow of fuel gas through the plurality of heat exchange units.

In another preferred embodiment (3) of the fuel cell stack (1), the heat exchange unit comprises a plurality of heat exchange units, and the first path comprises a series flow of fuel gas through the plurality of heat exchange units.

In yet another preferred embodiment (4) of the fuel cell stack (1), the fuel gas supply comprises (i) a plurality of fuel gas paths extending in the stacking direction of the fuel cell stack, and (ii) connection ports leading from the fuel gas paths and connected to interiors of at least, some of the plurality of power generation cells or to the heat exchange unit.

In yet another preferred embodiment (5), the fuel cell stack (4) comprises a plurality of bolts penetrating the fuel cell stack in the stacking direction to fix together the plurality of power generation cells and the heat exchange unit, wherein the plurality of fuel gas paths comprise hollow cavities provided in interiors of the plurality of bolts.

The fuel cell stack according to the present invention can achieve the following two effects (i) and (ii) at the same time. That is, the fuel cell stack according to the present invention can (i) effectively cool the power generation cells by providing a heat exchange unit through which the fuel gas flows between adjacent two of the power generation cells, and (ii) provide a high fuel-utilization efficiency. This is because the fuel cell stack according to the present invention has a fuel as supply path including the first path, the second path and the third path that are configured in series, wherein the second path and the third path are configured such that the fuel gas flows in parallel.

DESCRIPTION OF REFERENCE NUMERALS

Figure 1:
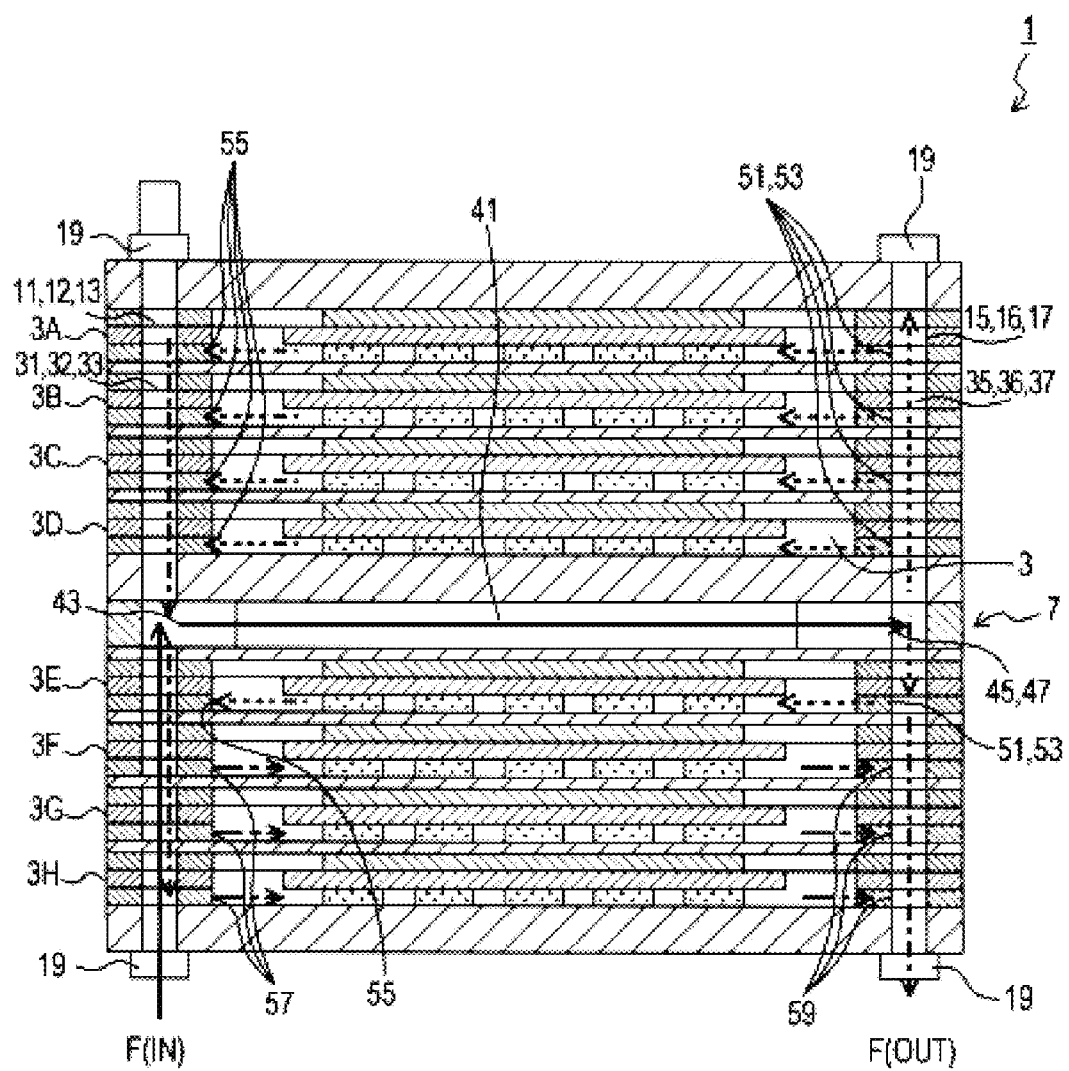
FIG. 1 is a cross-sectional view of a fuel cell stack 1 according to a first embodiment of the present invention, showing the configuration of the fuel cell stack 1 and the flow path of a fuel gas.

Reference numerals used to identify various features in the drawings including the following.
1 . . . Fuel cell stack; 1A and 1B . . . Sides; 3, 3A, 3B, 3C, 3D, 3E, 3F, 3G and 3H . . . Power generation cells; 7 . . . Heat exchange unit; 11 to 18 . . . Holes; 19 . . . Nuts; 21 to 28 . . . Bolts; 31 to 38 . . . Gas paths; 41 . . . Fuel gas flow path; 43, 51, 53, 57, 63, and 69 . . . Inlet ports; 45, 47, 55, 57, 59, 65, and 71 . . . Outlet ports; 49 . . . Fuel gas flow paths in power generation cells; 61 . . . Air flow path; 67 . . . Air flow paths in power generation cells; 101 . . . Solid electrolyte body; 103 . . . Fuel electrode; 105 . . . Air electrode; 107 . . . Cell body; 109 and 111 . . . Interconnectors; 113 and 119 . . . Gas sealing units; 115 . . . Separator; 117 . . . Fuel electrode frame; 121 . . . Fuel-electrode-side electric collector; 123 . . . Air-electrode-side electric collector; 125, 129, 135, 139, 142, 151, 151A, 151B, 157, 157A, 157B, and 157C . . . Holes; 127, 133, 137 and 141 . . . Openings; 131, 143, 153, 154, 159, 160, 161 . . . Communicating grooves; 145 . . . Air-electrode-side member; 147 . . . Fuel-electrode-side member; 149 and 155 . . . Concave portions.

DETAILED DESCRIPTION OF THE PREFERRED EMBODIMENTS

The present invention will now be described in greater detail with reference to the drawings. However, the present invention should not be construed as being limited thereto, First Embodiment I. Overall Configuration of Fuel Cell Stack A description of the configuration of a fuel cell stack 1 is provided based on FIG. 11 to FIG. 8. The fuel cell stack 1 is a solid oxide fuel cell, adopted for generating power by supplying the fuel cell stack with a fuel gas (e.g., hydrogen) and air (one embodiment of an oxidant gas).

Figure 2:
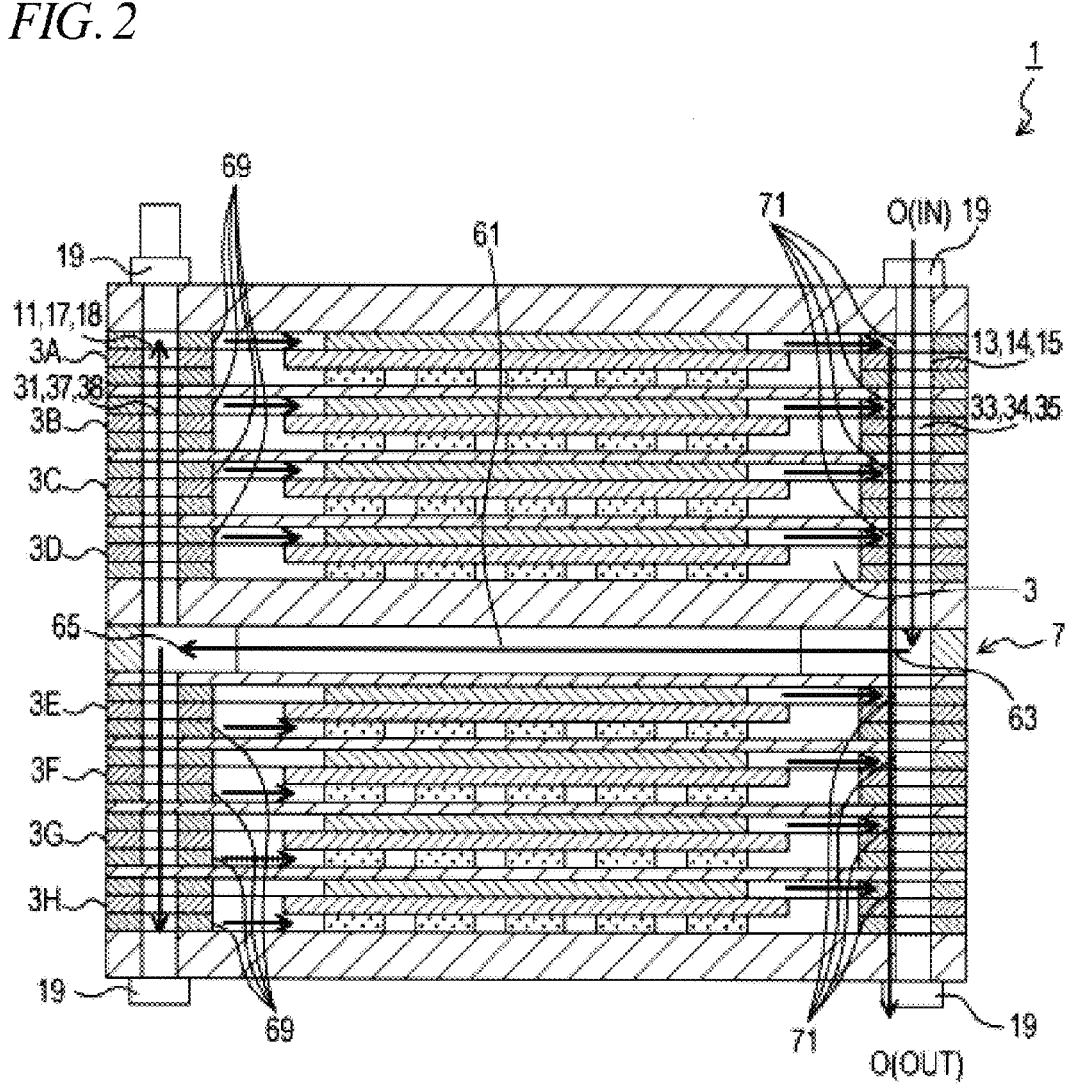
FIG. 2 is a cross-sectional view of the fuel cell stack 1 according to the first embodiment of the present invention, showing the configuration of the fuel cell stack 1 and the air flow path.

The fuel cell stack 1 has a stacked structure including fuel cells (hereinafter, referred to as power generation cells) 3, each being formed in a plate shape and functioning as a power generation unit, and a heat exchange unit 7 as shown in FIG. 1 and FIG. 2. There are eight power generation cells 3, which are denoted as 3A, 3B, 3C, 3D, 3E, 3F, 3G and 3H in this order from the top of FIG. 1 and FIG. 2.

The heat exchange unit 7 is in contact with and disposed between the power generation cells 3D and 3E. In other words, four power generation cells 3 are stacked above the heat exchange unit 7, while four other power generation cells are stacked below the heat exchange unit 7.

Figure 3:
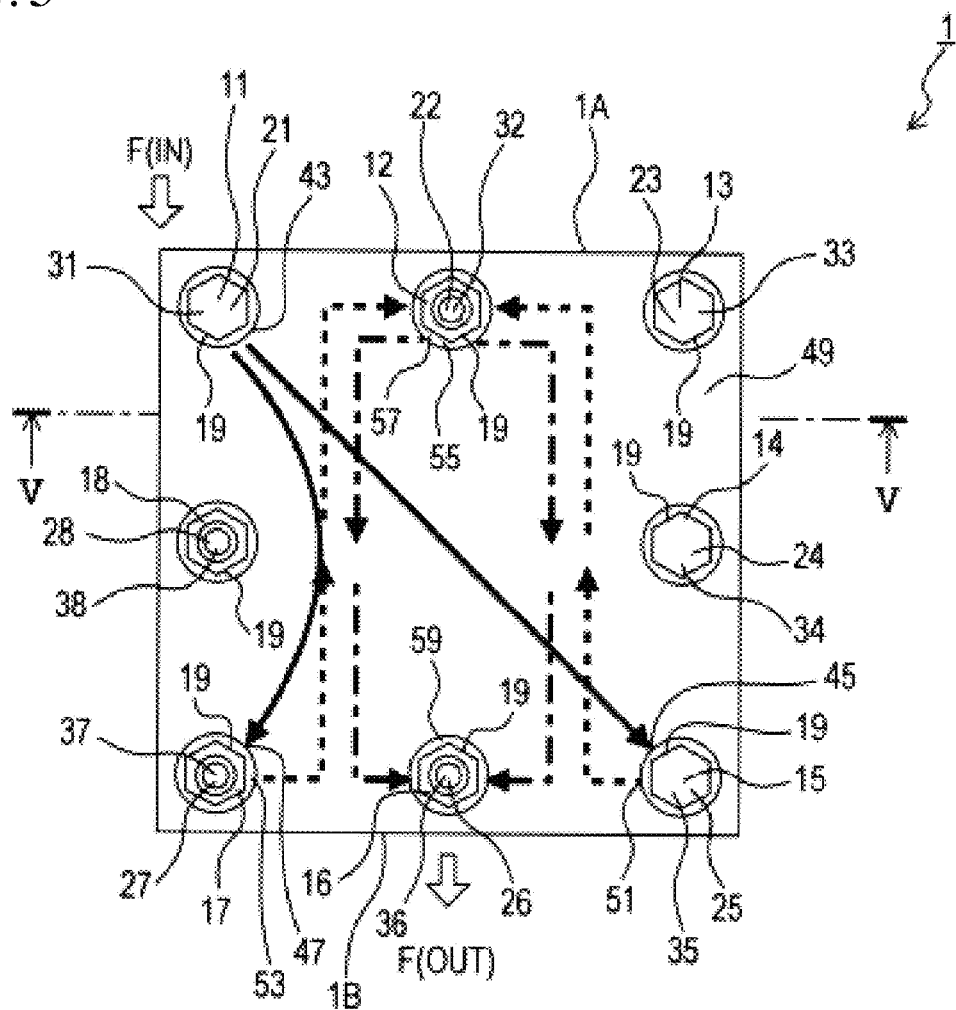
FIG. 3 is a plan view of the fuel cell stack 1 according to the first embodiment of the present invention, showing the configuration of the fuel cell stack 1 and the flow path of a fuel gas.
Figure 4:
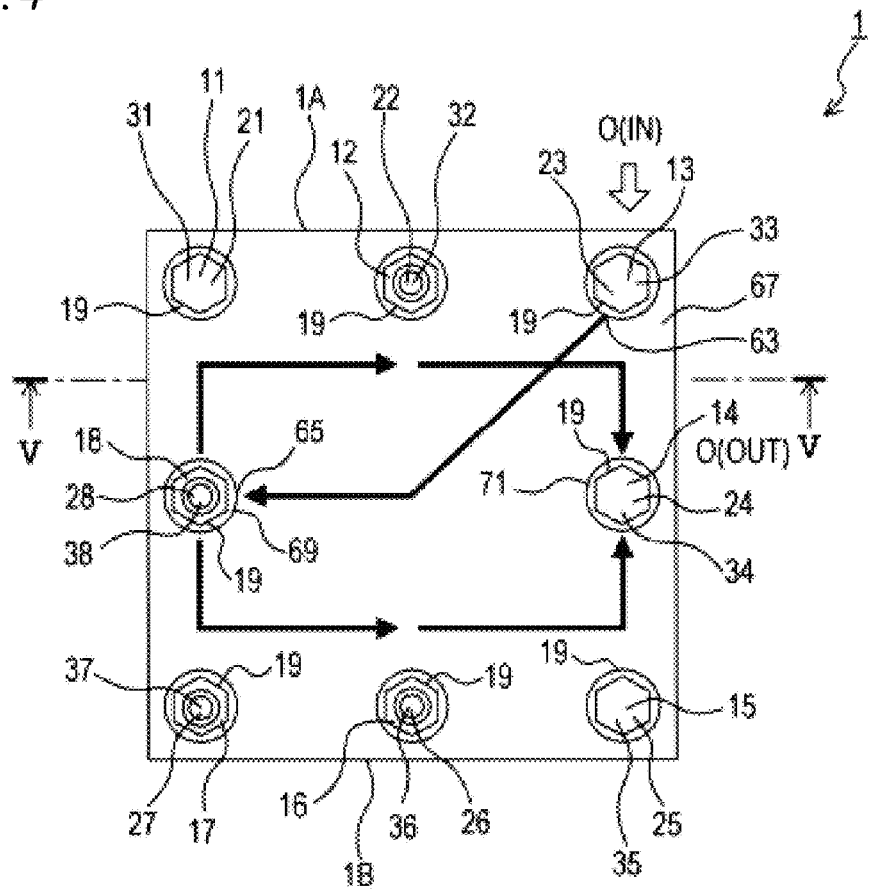
FIG. 4 is a plan view of the fuel cell stack 1 according to the first embodiment of the present invention, showing the configuration of the fuel cell stack 1 and the air flow path.

As shown in FIG. 3 and FIG. 4, the fuel cell stack 1, including the power generation cells 3 and the heat exchange unit 7, has a rectangular shape as viewed from a stacking direction of the power generation cells 3 (the up/down directions in FIG. 1 and FIG. 2, the directions perpendicular to the paper surfaces of FIG. 3 and FIG. 4).

The fuel cell stack 1 includes eight holes 11 to 18, each penetrating the fuel cell stack 1 in the stacking direction. The holes 11 to 18 are formed in each of the power generation cells 3 and the heat exchange unit 7 which constitute the fuel cell stack 1. When the fuel cell stack 1 is viewed from the stacking direction, the holes 11, 12, and 13 are formed at regular intervals along one side 1A that constitutes the outside shape of the fuel cell stack 1, and the hole 12 is disposed at the midpoint of the side 1A. In addition, the holes 15, 16 and 17 are formed at regular intervals along a side 1B opposed to the side 1A, and the hole 16 is disposed at the midpoint between the holes 15 and 17.

A bolt 21 is inserted into the hole 11, and nuts 19 are threadably mounted on both the ends of the bolt 21. The bolt 21 reaches from one end of the fuel cell stack 1 to the other end in the stacking direction. Similarly, bolts 22 to 28 are respectively inserted into the holes 12 to 18, and nuts 19 are threadably mounted on both the ends of the bolts 22 to 28. The power generation cells 3 and the heat exchange unit 7 are fixed by the bolts 21 to 28 and the nuts 19.

The bolts 21 to 28 respectively include gas paths 31 to 38 that are hollow (that include hollow cavities) in their interiors. The gas paths 31 to 38 respectively extend along the axial directions of the bolts 21 to 28, and reach from one end to the other end of the respective bolts 21 to 28. The gas paths 31 to 38 represent one embodiment of fuel gas paths.

Figure 7:
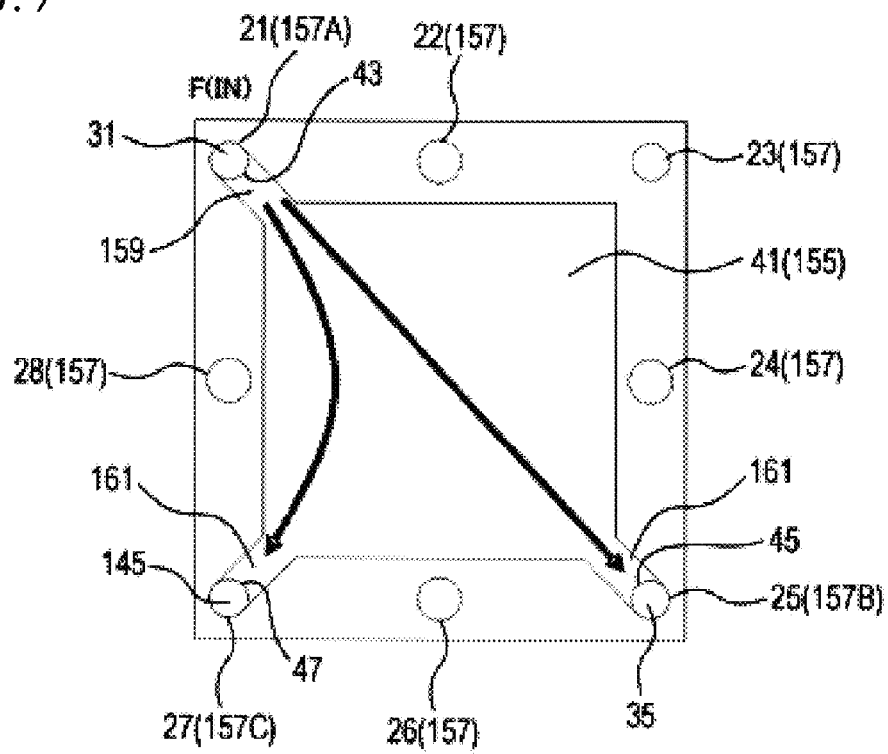
FIG. 7 is a plan view showing the flow of a fuel gas in the heat exchange unit 7.

The bolt 21 includes an inlet port 43 that defines a hole leading from the gas path 31 to an outer surface of the bolt 21, and is connected to a fuel gas flow path 41 described below in the heat exchange unit 7 as shown in FIG. 1, FIG. 3 and FIG. 7.

In addition, the bolt 25 includes an outlet port 45 that defines a hole leading from the gas path 35 to an outer surface of the bolt 25 to be connected to the fuel gas flow path 41.

In addition, the bolt 27 includes an outlet port 47 that defines a hole leading from the gas path 37 to an outer surface of the bolt 27 to be connected to the fuel gas flow path 41.

In addition, the bolt 25 includes five inlet ports 51 that define holes leading from the gas path 35 to an outer surface of the bolt 25 as shown in FIG. 1 and FIG. 3. The five inlet ports 51 are disposed at regular intervals along the up/down direction in FIG. 1, each communication with fuel gas flow paths in power generation cells 49 described below in the power generation cells 3A, 3B, 3C, 3D and 3E.

The bolt 27 includes five inlet ports 53 that define holes leading from the gas path 37 to an outer surface of the bolt 27 as shown in FIG. 1 and FIG. 3. The five inlet ports 53 are disposed at regular intervals along the up/down direction in FIG. 1, each communicating with the fuel gas flow paths 49 in the power generation cells 3A, 3B, 3C, 3D and 3E.

The bolt 22 includes five outlet ports 55 that define holes leading from the gas path 32 to an outer surface of the bolt 22 as shown in FIG. 1 and FIG. 3. The five outlet ports 55 are disposed at regular intervals along the up/down direction in FIG. 1, each communicating with the fuel gas flow paths 49 in the power generation cells 3A, 3B, 3C, 3D and 3E.

In addition, the bolt 22 includes three inlet ports 57 that define holes leading from the gas path 32 to the outer surface of the bolt 22 as shown in FIG. 1 and FIG. 3. The three inlet ports 57 are disposed at regular intervals along the up/down direction in FIG. 1, each communicating with the fuel gas flow paths 49 in the power generation cells 3F, 3G and 3H.

In addition, the bolt 26 includes three outlet ports 59 that define holes leading from the gas path 36 to the outer surface of the bolt 26 as shown in FIG. 1 and FIG. 3. The three outlet ports 59 are disposed at regular intervals along the up/down direction in FIG. 1, each communicating with the fuel gas flow paths 49 in the power generation cells 3F, 3G and 3H.

Figure 8:
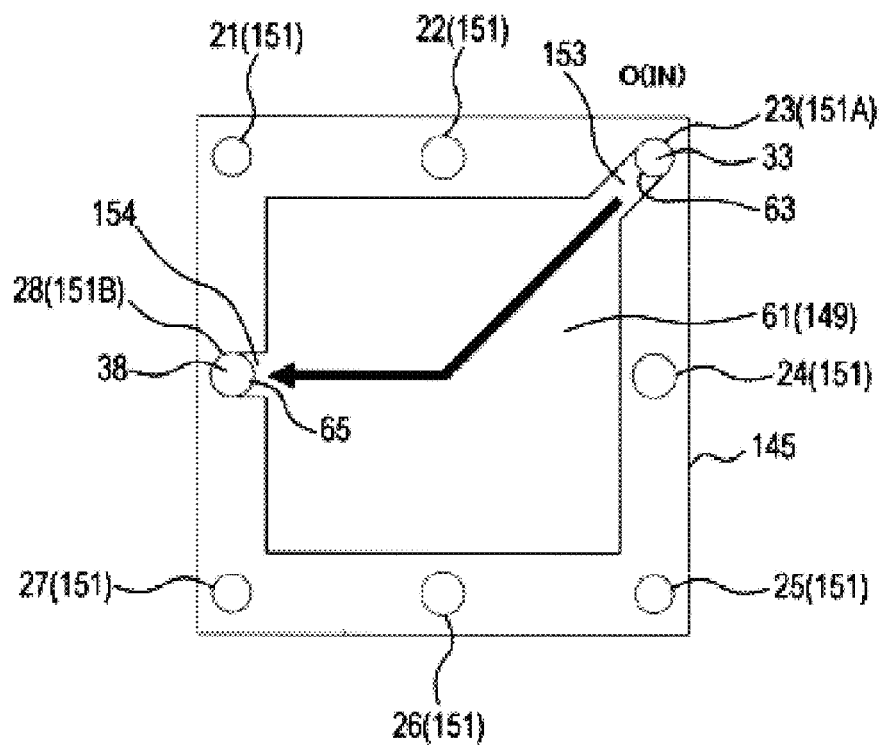
FIG. 8 is a plan view showing the flow of air in the heat exchange unit 7.

In addition, the bolt 23 includes an inlet port 63 that defines a hole leading from the gas path 33 to an outer surface of the bolt 23 and is connected to an air flow path 61 described below in the heat exchange unit 7 as shown in FIG. 2, FIG. 4 and FIG. 8. In addition, the bolt 28 includes an outlet port 65 that defines a hole leading from the gas path 38 to an outer surface of the bolt 28 to be connected to the air flow path 61.

In addition, the bolt 28 includes eight inlet ports 69 that define holes leading from the gas path 38 to the outer surface of the bolt 28 as shown in FIG. 2, FIG. 4 and FIG. 8. The eight inlet ports 69 are disposed at predetermined intervals along the up/down direction in FIG. 1, each communicating with air flow paths in power generation cells 67 described below in the power generation cells 3A, 3B, 3C, 3D, 3E, 3F, 3G and 3H.

In addition, the bolt 28 includes an outlet port 65 that defines a hole leading from the gas path 38 to an outer surface of the bolt 28 to be connected to the air flow path 61.

In addition, the bolt 27 includes an outlet port 47 that defines a hole leading from the gas path 37 to an outer surface of the bolt 27 and is connected to the fuel gas flow path 41.

In addition, the bolt 24 includes eight outlet ports 71 that define holes leading from the gas path 34 to the outer surface of the bolt 24 as shown in FIG. 2, FIG. 4, and FIG. 8. The eight outlet ports 71 are disposed at predetermined intervals along the up/down direction in FIG. 1, each communicating with the air flow paths 67 in the power generation cells 3A, 3B, 3C, 3D, 3E, 3F, 3G and 3H. Notably, each of the outlet ports and the inlet ports described above represents one embodiment of a connection port.

2. Configuration of Power Generation Cell.

Figure 5:
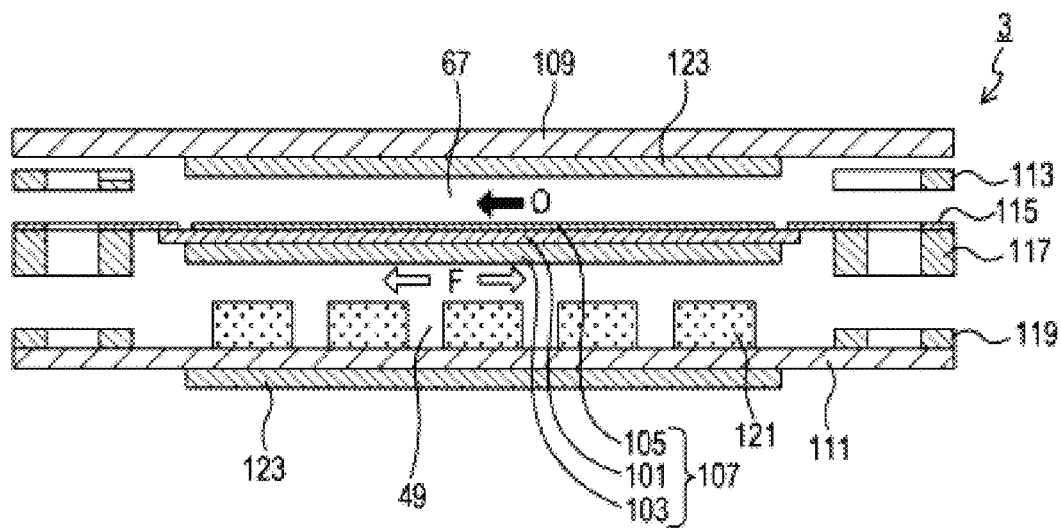
FIG. 5 is a cross-sectional view of a power generation cell 3 taken along the lines V-V of FIG. 3 and FIG. 4.
Figure 6:
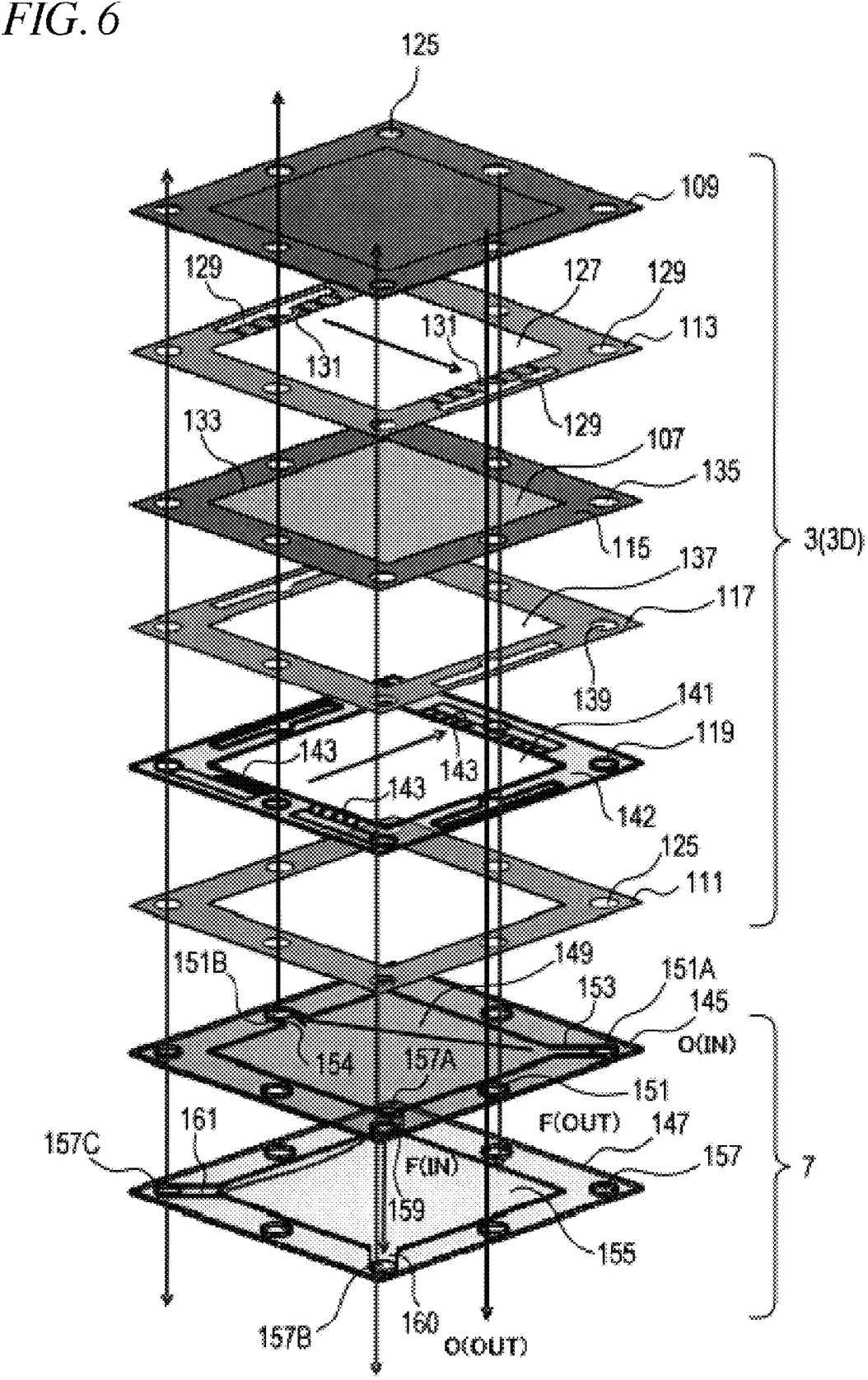
FIG. 6 is an exploded view of a power generation cell 3D and a heat exchange unit 7 showing the configuration of the power generation cell 3D and the heat exchange unit 7.

A description of the configuration of the power generation cell 3 is provided based on FIG. 5 and FIG. 6. The power generation cell 3 defines a plate-like cell which is a so-called fuel electrode supporting film-type cell. The power generation cell 3 includes a thin-film solid electrolyte body 101, a fuel electrode (anode) 103 and a thin-film air electrode (cathode) 105 that are provided on both the sides of the solid electrolyte body 101. Hereinafter, a combination of the solid electrolyte body 101, the fuel electrode 103 and the air electrode 105 is referred to as a cell body 107. The air flow path 67 resides on the side of the air electrode 105 of the cell body 107, and the fuel gas flow path 49 resides on the side of the fuel electrode 103 of the cell body 107.

In addition, the power generation cell 3 includes a top and bottom pair of interconnectors 109 and 111, a plate-like gas sealing unit 113 on the side of the air electrode 105, and a separator 115 to be connected to the upper surface of the outer edge of the cell body 107 for separating the air flow path 67 and the-fuel gas flow path 49, a fuel electrode frame 117 disposed on the side of the fuel gas flow path 49, and a gas sealing unit 119 on the side of the fuel electrode 103. Further, all of the members are stacked so as to have a monolithic construction.

Further, in the power generation cell 3, a fuel-electrode-side electric collector 121 is disposed between the fuel electrode 103 and the interconnector 111, and an air-electrode-side electric collector 123 is provided on a surface of the interconnector 109 so as to have a monolithic construction.

Here, materials such as YSZ (yttria-stabilized zirconia), ScSZ (scandia-stabilized zirconia), SDC (samaria doped ceria), GDC (gadolina doped ceria), and a perovskite oxide can be used as the material for the solid electrolyte body 101. In addition, a cermet of N and Ni, and ceramic can be used for the fuel electrode 103, and a cermet of a perovskite type oxide, a variety of noble metals, and ceramic can be used for the air electrode 105.

The interconnectors 109 and 111 define plate members made from ferritic stainless steel, and have eight holes 125 corresponding to the holes 11 to 18 on their outer edges.

The gas sealing unit 113 defines a frame-shaped plate member made from mica or vermiculite and having a square-shaped opening 127 in its center, and has eight holes 129 corresponding to the holes 11 to 18 on its outer edge. Among the holes 129, the two holes 129 corresponding to the holes 14 and 18 communicate with the opening 127 via a communicating groove 131. The communicating groove 131 is not a groove penetrating the gas sealing unit 113 in the thickness direction, but is a groove made by boring one surface of the gas sealing unit 113, and can be formed by laser processing or by press working.

The separator 115 defines a frame-shaped plate member made from ferritic stainless steel, and having a square-shaped opening 133 in its center. The cell body 107 is connected to the separator 115 so as to close the opening 133. The separator 115 also has eight holes 135 corresponding to the holes 11 to 18 on its outer edge.

The fuel electrode frame 117 defines a frame-shaped plate member made from terrific stainless steel, and having a square-shaped opening 137 in its center. The fuel electrode frame 117 also has eight holes 139 corresponding to the holes 11 to 18 on its outer edge.

The gas sealing unit 119 defines a frame-shaped plate member made from mica or vermiculite and having a square-shaped opening 141 in its center, and has eight holes 142 corresponding to the holes 11 to 18 on its outer edge. In the power generation cells 3A, 3B, 3C, 3D and 3E, the three holes 142 corresponding to the holes 12, 15, and 17 among the holes 142 communicate with the opening 141 via a communicating groove 143. In addition, in the power generation cells 3F, 3G and 3H, the two holes 142 corresponding to the holes 12 and 16 among the holes 142 communicate with the opening 141 via the communicating groove 143. The communicating groove 143 is not a groove penetrating the gas sealing unit 119 in the thickness direction, but is a groove made by boring one surface of the gas sealing unit 119, and can be formed by laser processing or by press working.

3. Configuration of Heat Exchange Unit

A description of the configuration of the heat exchange unit 7 is provided based on FIG. 6 to FIG. 8. The heat exchange unit 7 includes an air-electrode-side member 145 and a fuel-electrode-side member 147. The air-electrode-side member 145 defines a plate-like member adjacent to the power generation cell 3D, and includes a square-shaped concave portion 149 in the center of its surface on the side of the power generation cell 3D. In addition, the air-electrode-side member 145 has eight holes 151 corresponding to the holes 11 to 18 on its outer edge. Among the holes 151, two holes 151A and 151B corresponding to the holes 13 and 18 communicate with the concave portion 149 via communicating grooves 153 and 154. The concave portion 149 and the communicating grooves 153 and 154 do not penetrate the air-electrode-side member 145 in the thickness direction, but are made by boring the surface on the side of the power generation cell 3D.

The fuel-electrode-side member 147 defines a plate-like member with its one surface adjacent to the air-electrode-side member 145 and with the other surface adjacent to the power generation cell 3E, and includes a square-shaped concave portion 155 in the center of its surface on the side of the air-electrode-side member 145. In addition, the fuel-electrode-side member 147 has eight holes 157 corresponding to the holes 11 to 18 on its outer edge. Among the holes 157, three holes 157A, 157B and 157C corresponding to the holes 11, 15 and 17 communicate with the concave portion 155 via communicating grooves 159, 160 and 161. The concave portion 155 and the communicating grooves 159, 160 and 161 do not penetrate the fuel-electrode-side member 147 in the thickness direction, but are made by boring the surface on the side of the air-electrode-side member 145.

When the air-electrode-side member 145 is connected to the power generation cell 3D, the portions other than the concave portion 149, the hole 151 and the communicating grooves 153 and 154 on the surface of the air-electrode-side member 145 on the side of the power generation cell 3D are brought into intimate contact with the power generation cell 3D. As a result, the air flow path 61 that defines a closed space leading from the hole 151A to the hole 151B via the communicating groove 153, the concave portion 149 and the communicating groove 154 is provided between the air-electrode-side member 145 and the power generation cell 3D. The air flow path 61 communicates with the gas path 33 via the inlet port 63 at the side of the hole 151A (hole 13), and with the as path 38 via the outlet port 65 at the side of the hole 151B (hole 18) as described above.

Further, when the fuel-electrode-side member 147 is connected to the air-electrode-side member 145, the portions other than the concave portion 155, the hole 157 and the communicating grooves 159, 160 and 161 on the surface of the fuel-electrode-side member 147 on the side of the air-electrode-side member 145 are brought into intimate contact with the air-electrode-side member 145. As a result, the fuel gas flow path 41 is formed between the fuel-electrode-side member 147 and the air-electrode-side member 145, which are defined by closed spaces, leading from the hole 157A to the hole 157B via the communicating groove 159, the concave portion 155 and the communicating groove 160, or leading from the hole 157A to the hole 157C via the communicating groove 159, the concave portion 155 and the communicating groove 161. The fuel gas flow path 41 communicates with the gas path 31 via the inlet port 43 at the side of the hole 157A (hole 11), and with the gas paths 35 and 37 via the outlet ports 45 and 47 at the sides of the hole 157B (hole 15) and the hole 157C (hole 17) as described above.

4. Fuel Gas and Oxidant Gas Flows.

First, a description of the flow of a fuel as is provided. A fuel gas is introduced from the end portion of the path 31 (indicated as F (IN) in FIG. 1 and FIG. 3) on the side of the power generation cell 3H as shown in FIG. 1 and FIG. 3, passes through the path 31 and the inlet port 43, and enters into the fuel gas flow path 41 of the heat exchange unit 7. Further, the fuel gas flows in the fuel gas flow path 41, and enters into the path 35 via the outlet port 45 while entering the path 37 via the outlet port 47 as shown in FIG. 7.

The fuel gas which has entered into the path 35 flows in the path 35 to pass through the inlet ports 51 at five positions (branch off), and enters into the in-cell fuel gas flow paths 49 in the power generation cells 3A, 3B, 3C, 3D and 3E as shown in FIG. 1 and FIG. 3. In addition, the fuel gas having entered into the path 37 passes through the inlet ports 53 at five positions (branches off), and enters into the fuel gas flow paths 49 in the power generation cells 3A, 3B, 3C, 3D and 3E.

Further, the fuel gas flows in the fuel gas flow paths 49 in the power generation cells 3A, 3B, 3C, 3D and 3E in parallel, and passes through the outlet ports 55 at five positions to enter into the path 32 as shown in FIG. 3.

Further, the fuel gas passes through the path 32, and passes through the outlet ports 57 at three positions (branches off) to enter into the fuel gas flow paths 49 in the power generation cells 3F, 3G and 3H. The fuel gas flows in the fuel gas flow paths 49 in the power generation cells 3F, 3G and 3H in parallel, and passes through the outlet ports 59 at three positions to enter into the path 36 as shown in FIG. 3.

Then, the fuel gas is discharged from the end portion of the path 36 (indicated as F (OUT) in FIG. 1 and FIG. 3) on the side of the power generation cell 3H. The above-described path of the flow of the fuel gas is one embodiment of a fuel gas supply path.

The arrows in FIG. 1, FIG. 3 and FIG. 7 indicate the fuel gas flows. Among these arrows, the solid arrows indicate the flow of the fuel gas in a first path, the dot-line arrows indicate the flow of the fuel gas in a second path, and the dashed-dotted-line arrows indicate the flow of the fuel gas in a third path.

That is, the above-described path of the flow of the fuel gas includes the first path, the second path and the third path in series. Here, the expression "in series" means that the fuel gas flows in the first path, the second path and the third path sequentially in this order.

Next, a description of the air flow is provided. Air is introduced from the end portion of the path 33 (indicated as O (IN) in FIG. 2 and FIG. 4) on the side of the power generation cell 3A as shown in FIG. 2 and FIG. 4, passes through the path 33 and the inlet port 63, and enters into the air flow path 61 of the heat exchange unit 7. Further, the air flows in the air flow path 61, and enters into the gas path 38 via the outlet port 65 as shown in FIG. 8.

The air having entered into the gas path 38 flows in the gas path 38 to pass through the inlet ports 69 at eight positions, and enters into the air flow path 67 in each power generation cell 3 as shown in FIG. 2 and FIG. 4. Further, the air flows in the air flow paths 67 in the power generation cells 3 in parallel, and passes through the outlet ports 71 at eight positions to enter into the path 34 as shown in FIG. 2 and FIG. 4. Then, the air is discharged from the end portion of the gas path 38 (indicated as O (OUT) in FIG. 2 and FIG. 4) on the side of the power generation cell 3H. The above-described air flow path is one embodiment of an oxidant gas supply path. The arrows in FIG. 2, FIG. 4 and FIG. 8 indicate the air flow.

5. Effect Produced by Fuel Cell Stack (1) The fuel cell stack 1 includes the heat exchange unit 7 between the two adjacent power generation cells 3D and 3E, and is configured such that a fuel gas can flow in the heat exchange unit 7. Thus, the power generation cells 3 can be efficiently cooled. In particular, because the heat exchange unit 7 is provided substantially close to the center of the fuel cell stack 1 where heat is liable to accumulate, the effect of cooling the power generation cells 3 is further enhanced.

In addition, because the heat exchange unit 7 is disposed on an upstream side in the flow of the fuel gas, the effect of cooling the power generation cells 3 is further enhanced.

Further, the number of stacked power generation cells 3 supplied with the fuel gas by the second path (hereinafter, referred to as the upstream side) is greater than the number of stacked power generation cells 3 supplied with the fuel gas by the third path. Consequently, the power generation cells 3 on the upstream side are more likely to accumulate heat. However, disposing the heat exchange unit 7 on the upstream side can reduce the accumulation of heat on the upstream side.

(2) In the second path, the inlet ports of the fuel gas in the power generation cells 3A, 3B, 3C, 3D and 3E are the inlet ports 51 and 53 provided to the bolts 25 and 27, and the outlet ports of the fuel gas in the power generation cells 3A, 3B, 3C, 3D and 3E are the outlet ports 55 provided to the bolt 22.

In addition, in the third path, the inlet ports of the fuel gas in the power generation cells 3F, 3G and 3H are the inlet ports 57 provided to the bolt 22, and the outlet ports of the fuel gas in the power generation cells 3F, 3G and 3H are the outlet ports 59 provided to the bolt 26.

The inlet ports 51 and 53 are disposed at two positions along the side 1B of the power generation cells 3, and the outlet ports 55 are disposed on the side 1A opposed to the side 1B as viewed from the stacking direction. In addition, the inlet ports 57 are disposed at positions coinciding with the outlet ports 55, and the outlet ports 59 are disposed at the midpoint between the inlet ports 51 and 53 as viewed from the stacking direction.

Disposing the inlet ports 51, 53 and 57, and the outlet ports 55 and 59 as described above allows the fuel as to flow uniformly in each power generation cell, and to thereby generate electricity uniformly.

In addition, the fuel gas is prevented from accumulating in each power generation cell 3, and the number of bolts including paths for a fuel gas can be reduced.

(3) By arranging the fuel as supply path including the first path, the second path and the third path in series, and the flow of fuel gas in the second and third paths in parallel, the fuel cell stack 1 achieves a high fuel utilization rate.

Second Embodiment

1. Configuration of Fuel Cell Stack

While the configuration of the fuel cell stack 1 of the second embodiment is basically the same as the configuration of the above-described first embodiment, there is a partial difference between them. Hereinafter, a description of the differences will mainly be provided based on FIG. 9 to FIG. 12, and descriptions of the constituent elements similar to those of the above-described first embodiment are omitted or simplified.

Figure 9:
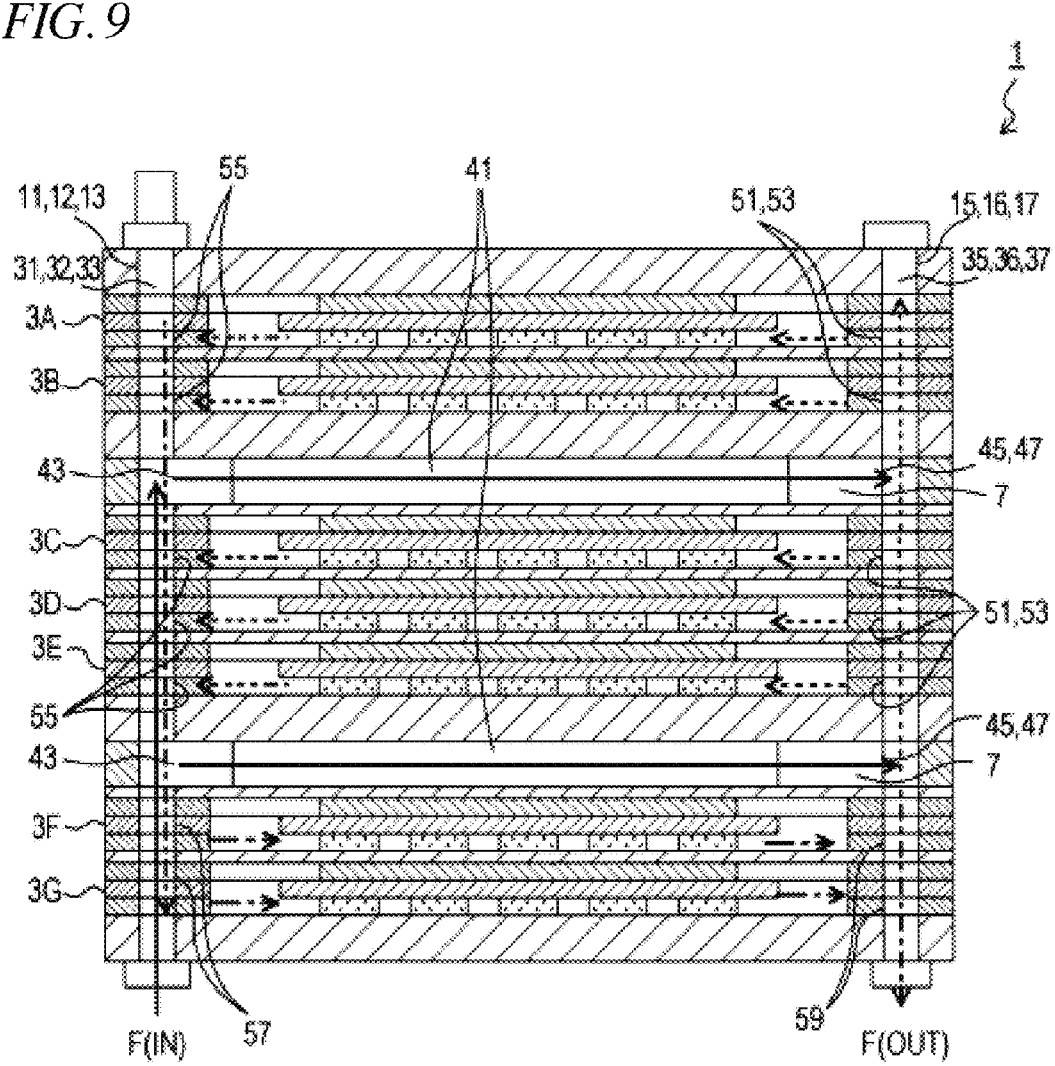
FIG. 9 is a cross-sectional view of the fuel cell stack 1 according to a second embodiment of the invention, showing the configuration of the fuel cell stack 1 and the flow path of a fuel gas.
Figure 10:
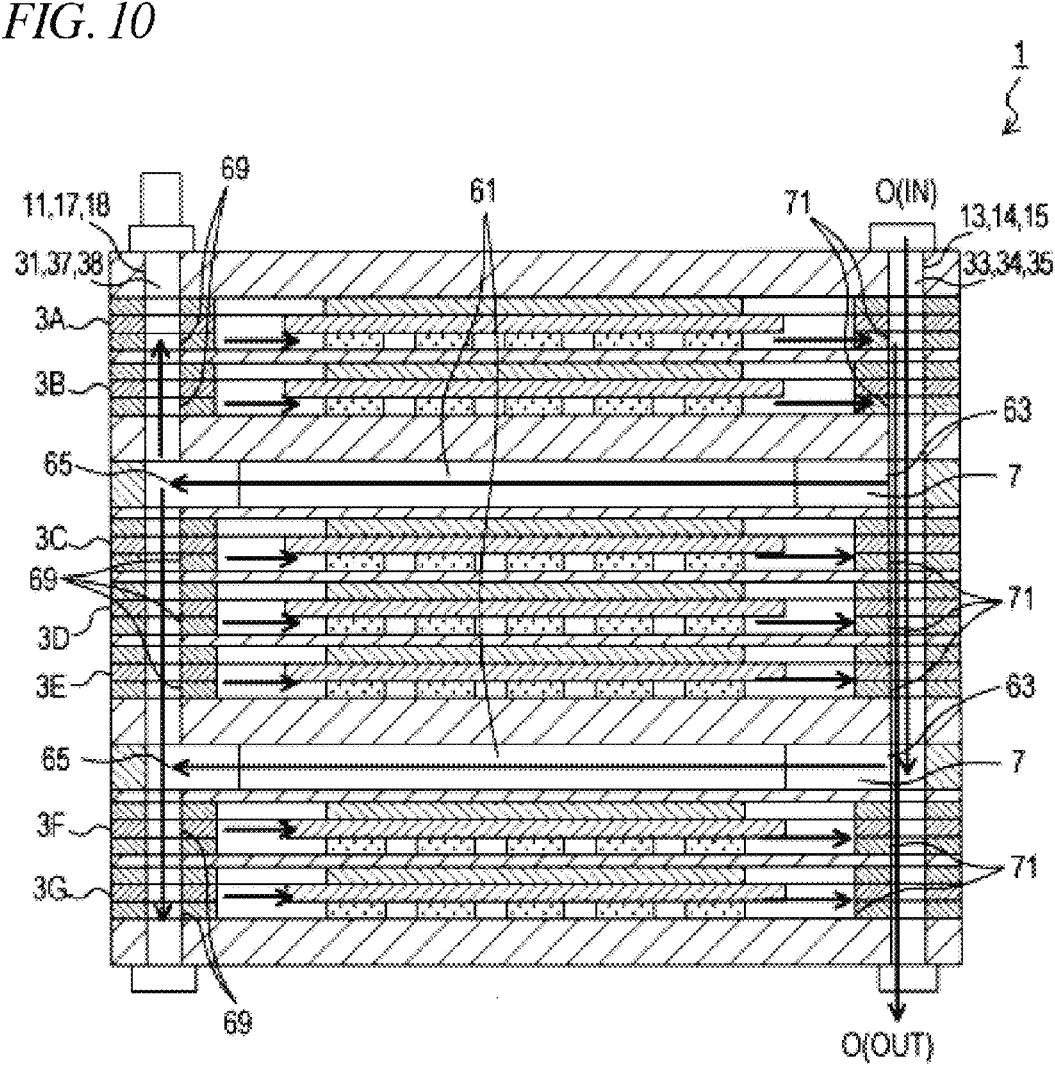
FIG. 10 is a cross-sectional view of the fuel cell stack 1 according to the second embodiment of the invention, showing the configuration of the fuel cell stack 1 and the air flow path.

The fuel cell stack 1 includes the seven power generation cells 3 and the two heat exchange units 7 as shown in FIG. 9 and FIG. 10. The two heat exchange units 7 are each provided between the power generation cells 3B and 3C, and the power generation cells 3E and 3F.

2. Flows of Fuel Gas and Oxidant Gas

Figure 11:
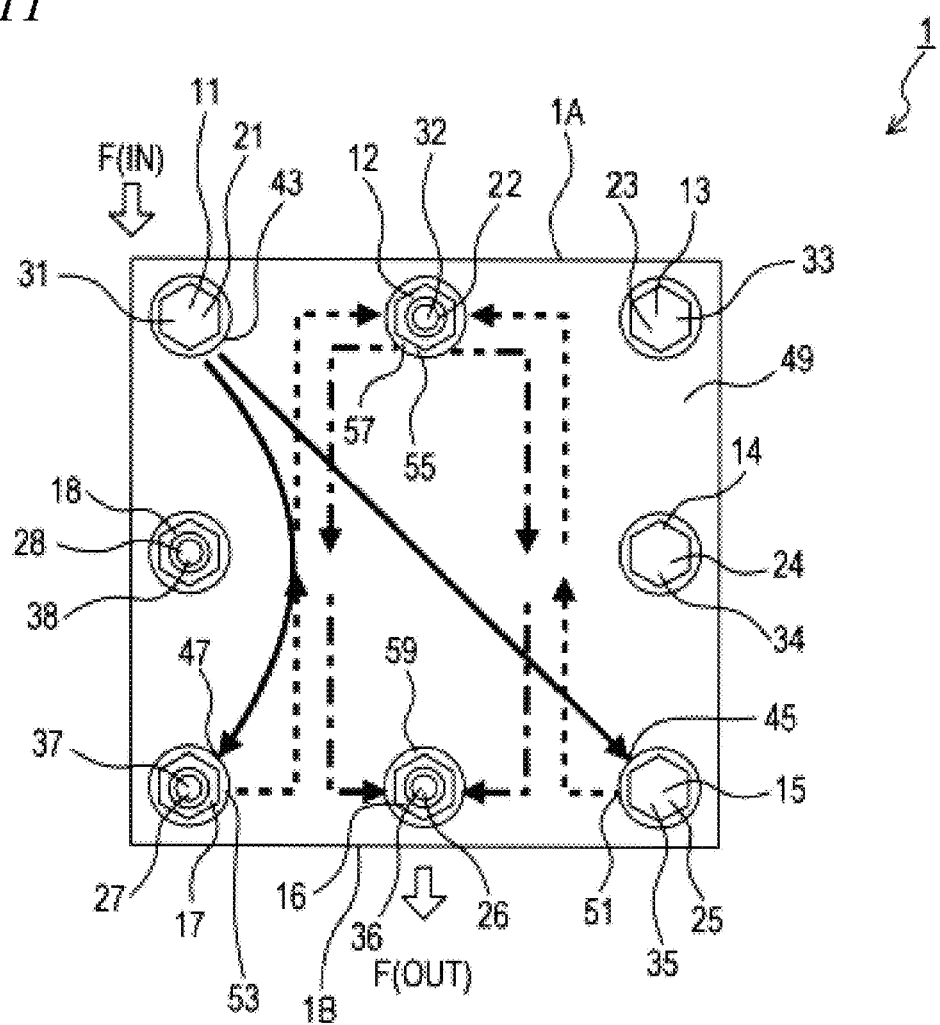
FIG. 11 is a plan view of the fuel cell stack 1 according to the second embodiment of the invention, showing the configuration of the fuel cell stack 1 and the flow path of a fuel gas.

First, a description of the flow of a fuel as is provided. A fuel gas is introduced from the end portion of the path 31 (indicated as F (IN) in FIG. 9 and FIG. 11) on the side of the power generation cell 3G as shown in FIG. 9 and FIG. 11, passes through the path 31 and the inlet ports 43, and enters into each of the fuel gas flow paths 41 of the two heat exchange units 7. Further, the fuel gas flows in the fuel gas flow path 41 in each of the two heat exchange units 7, and enters into the path 35 via the outlet ports 45 while entering the path 37 via the outlet ports 47 as shown in FIG. 7. The inlet ports 43, the outlet ports 45 and the outlet ports 47 corresponding to the two heat exchange units 7 are provided.

The fuel gas having entered into the path 35 flows in the path 35 to pass through the inlet ports 51 at five positions (branch off), and enters into the in-cell fuel gas flow paths 49 in the power generation cells 3A, 3B, 3C. 3D and 3E as shown in FIG. 9 and FIG. 11. In addition, the fuel gas having entered into the path 37 passes through the inlet ports 53 at five positions, and enters into the in-cell fuel gas flow paths 49 in the power generation cells 3A, 3B, 3C, 3D and 3E.

Further, the fuel gas flows in the fuel gas flow paths 49 in the power generation cells 3A, 3B, 3C, 3D and 3E in parallel, and passes through the outlet ports 55 to enter into the path 32 as shown in FIG. 9 and FIG. 11.

Further, the fuel gas passes through the path 32, and passes through the outlet ports 57 at two positions to enter into the fuel gas flow paths 49 in the power generation cells 3F and 3G. The fuel gas flows in the fuel gas flow paths 49 in the power generation cells 3F and 3G in parallel, and passes through the outlet ports 59 to enter into the path 36 as shown in FIG. 9 and FIG. 11.

Then, the fuel gas is discharged from the end portion of the path 36 (indicated as F (OUT) in FIG. 9 and FIG. 11) on the side of the power generation cell 3G.

Figure 12:
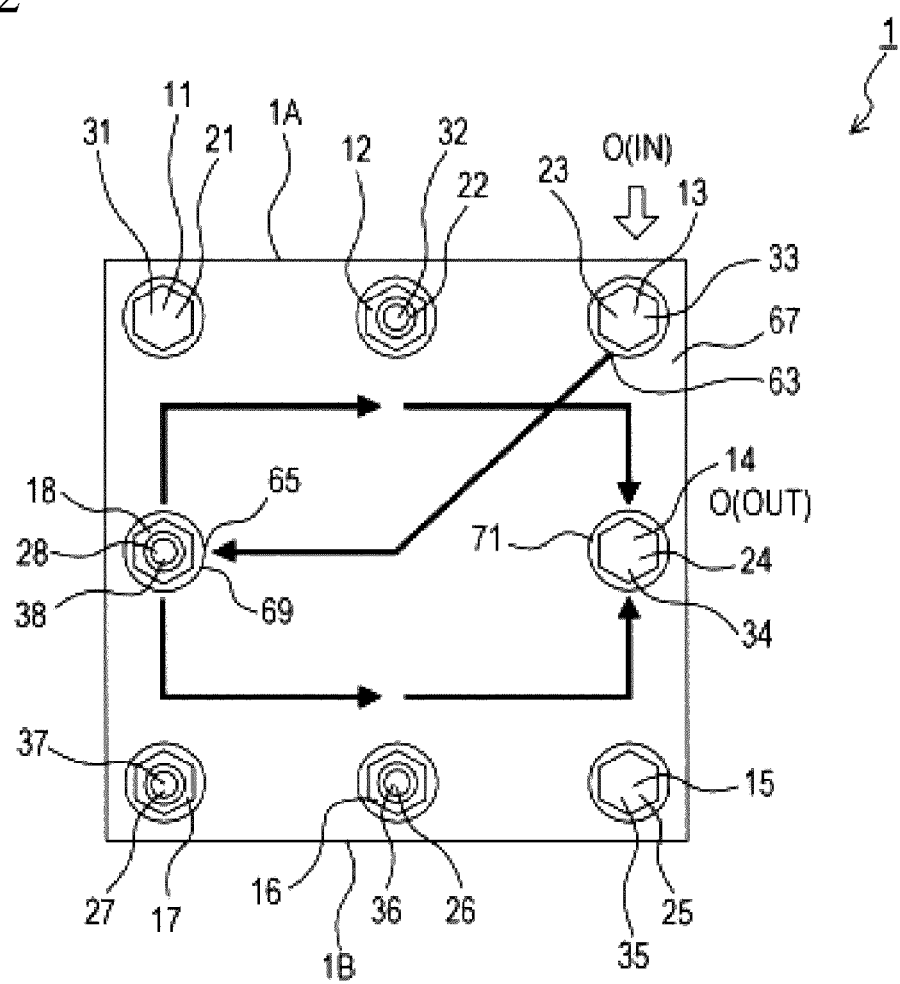
FIG. 12 is a plan view of the fuel cell stack 1 according to the second embodiment of the invention, showing the configuration of the fuel cell stack 1 and the air flow path.

Next, a description of the air flow is provided. Air is introduced from the end portion of the path 33 (indicated as O (IN) in FIG. 10 and FIG. 12) on the side of the power generation cell 3A as shown in FIG. 10 and FIG. 12, passes through the path 33 and the inlet ports 63 at two positions, and enters into each air flow path 61 of the two heat exchange units 7. Further, the air flows in each air flow path 61 in the two heat exchange units 7, and enters into the gas path 38 via the outlet ports 65 at two positions as shown in FIG. 8.

The air having entered into the gas path 38 flows in the gas path 38 to pass through the inlet ports 69, and enters into each air flow path 67 in the power generation cells 3 as shown in FIG. 10 and FIG. 12. Further, the air flows in the air flow paths 67 in parallel, and passes through the outlet ports 71 to enter into the path 34 as shown in FIG. 10 and FIG. 12. Then, the air is discharged from the end portion of the gas path 34 (indicated as O (OUT) in FIG. 10 and FIG. 12) on the side of the power generation cell 3G.

3. Effect Produced by Fuel Cell Stack

The fuel cell stack of the second embodiment is capable of producing an effect substantially similar to the effect produced by the fuel cell stack 1 according to the above-described first embodiment. In addition, by including the two heat exchange units 7, the effect of cooling the power generation cells 3 is further enhanced.

The present invention is not limited to the above-described embodiments, and it will be apparent to those skilled in the art that various changes may be made without departing from the spirit and scope of the claims appended hereto.

For example, the number of the power generation cells 3 provided in the fuel cell stack 1 need not be limited to seven or eight, but can be determined appropriately. In addition, the number of heat exchange units 7 included in the fuel cell stack 1 is not limited to one or two, and can be determined appropriately.

In addition, the position in the stacking direction of the heat exchange unit 7 may be in the center of the fuel cell stack 1, or may be close to an end of the fuel cell stack 1.

In addition, the positional relation between the inlet ports 51 and 53, and the outlet ports 59 is not limited to the above-described positional relation. For example, as-viewed from the stacking direction, the positions of the outlet ports 59 may be at an equal distance from the inlet ports 51 and 53, or may be closer to either of the inlet ports 51 and 53. In addition, the positions of the outlet ports 59 may be on straight lines connecting the inlet ports 51 and 53, or may be off the straight lines.

In addition, the positions of the outlet ports 55 and the inlet ports 57 are not limited to the above-described positions. For example, as viewed from the stacking direction, the outlet ports 55 and the inlet ports 57 may be at an equal distance from the bolts 21 and 23, or may be closer to either of the bolts 21 and 23. In addition, the positions of the outlet ports 55 and the inlet ports 57 may be on straight lines connecting the bolts 21 and 23, or may be off the straight lines.

This application is based on Japanese Patent Application No. 2013-072923 filed Mar. 29, 2013, incorporated herein by reference in its entirety.

What is claimed is:

1. A fuel cell stack comprising:
a first stack comprising a plurality of contiguously stacked power generation cells;
a second stack comprising a plurality of contiguously stacked power generation cells;
a heat exchange unit provided between adjacent power generation cells of the first stack and the second stack;
a fuel gas supply path arranged to supply the power generation cells of the first stack and the second stack with fuel gas; and
an oxidant gas supply path arranged to supply the power generation cells of the first stack and the second stack with an oxidant gas,
wherein the fuel gas supply path comprises in series a first path passing through the heat exchange unit, a second path passing through some of the plurality of power generation cells in both the first stack and the second stack in parallel, and a third path passing through a plurality of the power generation cells in the second stack, in parallel, other than the some of the power generation cells of the second stack where the second path passes.

2. The fuel cell stack as claimed in claim 1, further comprising:
a third stack comprising a plurality of contiguously stacked power generation cells; and
another heat exchange unit,
wherein the another heat exchange unit is provided between adjacent power generation cells of the first stack and the third stack,
wherein the fuel gas supply path is arranged to supply the power generation cells of the third stack with fuel gas,
wherein the oxidant gas supply path is arranged to supply the power generation cells of the third stack with the oxidant gas, and
wherein the first path comprises a parallel flow of fuel gas through the heat exchange unit and the another heat exchange unit.

3. The fuel cell stack as claimed in claim 1, further comprising:
a third stack comprising a plurality of contiguously stacked power generation cells; and
another heat exchange unit,
wherein the another heat exchange unit is provided between adjacent power generation cells of the first stack and the third stack,
wherein the fuel gas supply path is arranged to supply the power generation cells of the third stack with fuel gas,
wherein the oxidant gas supply path is arranged to supply the power generation cells of the third stack with the oxidant gas, and
wherein the first path comprises a series flow of fuel gas through the plurality of heat exchange units.

4. The fuel cell stack as claimed in claim 1, wherein the fuel gas supply path comprises connection ports leading from the fuel gas paths and connected to interiors of at least some of the plurality of power generation cells of the first stack and the second stack or to the heat exchange unit.

5. The fuel cell stack as claimed in claim 4, comprising a plurality of bolts penetrating the fuel cell stack in the stacking direction to fix together the plurality of power generation cells of the first stack, the heat exchange unit, and the plurality of power generation cells of the second stack,
wherein the plurality of fuel gas paths comprise cavities provided in interiors of the plurality of bolts.

6. The fuel cell stack as claimed in claim 1, wherein the second path passes through more power generation cells than the third path.

7. The fuel cell stack as claimed in claim 1, wherein the second path and the third path are configured such that the flow of fuel gas through the power generation cells of the second path is in an opposite direction to the flow of fuel gas through the power generation cells of the third path.

* * * * *